United States Patent
Zieris et al.

(10) Patent No.: US 10,865,682 B2
(45) Date of Patent: Dec. 15, 2020

(54) LINE SECTION FOR THE TEMPERATURE-CONTROLLED GUIDING OF A REDUCTANT FOR THE EXHAUST GAS AFTERTREATMENT OF AN INTERNAL COMBUSTION ENGINE

(71) Applicant: VOSS AUTOMOTIVE GMBH, Wipperfürth (DE)

(72) Inventors: Volker Zieris, Burscheid (DE); Sascha Rosenfeldt, Wipperfürth (DE); Sebastian Hesselfeld, Wipperfürth (DE); Alexander Bohl, Wuppertal (DE); Reiner Mitterer, Wipperfürth (DE)

(73) Assignee: VOSS Automotive GmbH

( * ) Notice: Subject to any disclaimer, the term of this patent is extended or adjusted under 35 U.S.C. 154(b) by 0 days.

(21) Appl. No.: 16/470,902

(22) PCT Filed: Dec. 6, 2017

(86) PCT No.: PCT/EP2017/081649
§ 371 (c)(1),
(2) Date: Jun. 18, 2019

(87) PCT Pub. No.: WO2018/114330
PCT Pub. Date: Jun. 28, 2018

(65) Prior Publication Data
US 2020/0088079 A1   Mar. 19, 2020

(30) Foreign Application Priority Data
Dec. 19, 2016  (DE) .................. 20 2016 107 103 U

(51) Int. Cl.
*F01N 3/00* (2006.01)
*F01N 3/20* (2006.01)

(52) U.S. Cl.
CPC .................................. *F01N 3/208* (2013.01)

(58) Field of Classification Search
CPC .... F01N 3/208; F01N 3/2066; F01N 2610/02; F01N 2610/14; F01N 2610/1486; F01N 2530/18; F01N 2610/10
(Continued)

(56) References Cited

U.S. PATENT DOCUMENTS 8,209,957 B2   4/2012 Behrendt et al.
9,353,662 B2 *  5/2016 Schwarzkopf ........ F01N 3/2066
(Continued)

FOREIGN PATENT DOCUMENTS

DE   202007015036 U1   3/2009
DE   102010055520 A1   6/2012
(Continued)

OTHER PUBLICATIONS

International Preliminary Report on Patentability dated Jul. 4, 2019 for PCT/EP2017/081649.

*Primary Examiner* — Jason D Shanske
(74) *Attorney, Agent, or Firm* — Eric J. Sosenko; Jonathan P. O'Brien; Honigman LLP

(57) ABSTRACT

A line section for temperature-controlled guiding of a reductant for the exhaust gas post-treatment of an internal combustion engine, comprising a first line for guiding the reductant, a second line for guiding a temperature control agent, and a casing surrounding the first and second lines. The first and second lines are disposed extending adjacent to each other in the casing and guided in a coupling housing connected to the casing. Both the first and second lines are guided through the entire coupling housing while extending adjacent to each other.

22 Claims, 4 Drawing Sheets

(58) Field of Classification Search
USPC .......................................................... 60/295
See application file for complete search history.

(56) References Cited

U.S. PATENT DOCUMENTS

| | | | |
|---|---|---|---|
| 9,920,673 B2* | 3/2018 | Becht | F01N 3/206 |
| 2011/0006513 A1* | 1/2011 | Lechner | F16L 25/01 |
| | | | 285/122.1 |
| 2011/0241333 A1 | 10/2011 | Borgmeier et al. | |
| 2012/0100735 A1* | 4/2012 | Rosenfeldt | H05B 3/40 |
| | | | 439/190 |
| 2013/0333772 A1 | 12/2013 | Schwarzkopf et al. | |
| 2016/0069236 A1 | 3/2016 | Becht et al. | |

FOREIGN PATENT DOCUMENTS

| | | |
|---|---|---|
| DE | 102014112731 A1 | 3/2016 |
| EP | 1770251 A1 | 4/2007 |
| EP | 2010768 B1 | 1/2009 |

* cited by examiner

LINE SECTION FOR THE TEMPERATURE-CONTROLLED GUIDING OF A REDUCTANT FOR THE EXHAUST GAS AFTERTREATMENT OF AN INTERNAL COMBUSTION ENGINE

BACKGROUND

1. Field of the Invention

The invention relates to a line section for the temperature-controlled guiding of a reductant for the exhaust-gas post-treatment of an internal combustion engine. More specifically, the invention relates to such a line section including a first line for guiding the reductant, a second line for guiding a temperature control agent, and a casing surrounding the two lines, wherein the two lines are disposed extending adjacent to each other and guided in a coupling housing and the casing is connected to the coupling housing.

2. Description of Related Technology

To reduce nitrogen oxide emissions of an internal combustion engine, it is known in principle to convert the nitrogen oxides arising during the combustion into atmospheric nitrogen and steam with the aid of the selective catalytic reduction (Selective Catalytic Reduction—abbreviated: SCR). Here an aqueous urea solution known under the name Adblue® is generally used as reductant, which is stored in a reductant tank unit. Using this solution, which has a freezing point of −11.5° C., the emission of nitrogen oxides ($NO_x$) in diesel engines can be reduced by up to 90 percent.

Line sections of the above-mentioned type are components of SCR systems that preferably comprise an SCR vacuum line section, an SCR return line section, and an SCR pressure line section, as well as a reductant tank, a reductant pump unit, and a reductant metering unit.

The reductant is supplied to the reductant metering unit by the reductant pump unit. The reductant metering unit supplies the reductant to the exhaust gas stream of the internal combustion engine in a controlled manner prior to the catalyst. Since the exhaust gas stream is particularly hot, high temperatures arise in the reductant metering unit that require a cooling of the reductant metering unit during the operation of the internal combustion engine. Here the reductant metering unit is cooled, for example, by the cooling water circuit of the internal combustion engine. Alternatively, the reductant metering unit can be cooled by the reductant itself, wherein however more reductant is needed for this purpose than for the chemical SCR process; the reductant is pumped into the reductant metering unit. Excess reductant is then pumped by the reductant pump unit via the SCR return line section from the reductant metering unit back into the reductant tank unit. The reductant metering unit, the reductant tank unit, and the reductant pump unit are connected to one another by the line sections via suitable couplings.

The internal combustion engines are also used at low temperatures down to less than −12° C., wherein the reductant can thus freeze in the various units and in the lines, in particular if aqueous urea solution is used as reductant. The SCR system can thereby be damaged. In order to prevent freezing, the individual units and the lines are heated if necessary, in particular depending on the external temperatures and the operating phase.

For this purpose, in particular electrically heatable units and lines are known such as are described, for example, in DE10,2010/055,520 A1.

Known SCR line bundles are described in EP1,770,251 A1 and in EP2,010,768 A1, wherein a line guiding the reductant for the forward flow and a line guiding the reductant for the return flow are present, wherein for each line guiding reductant a line guiding heating water as a temperature-control agent is disposed pairwise in close proximity in a heat-emitting manner, and wherein the line pairs are retained in axially extending recesses, open to the outer circumference, of a section profile comprising a thermally conductive, elastomeric material. Here the heating water is branched off from the cooling water circuit of the internal combustion engine. The lines include suitable plug couplings in order to connect them to the various units of the SCR system and to the cooling water circuit. The plug couplings comprise terminal blocks flushed by the heating water, which terminal blocks are to prevent a freezing of the plug couplings. Such SCR line bundles have the disadvantage that they can be damaged by environmental influences. In addition, the installation of such SCR lines and SCR line bundles is seldom flexible, in addition to being expensive, and they require a relatively large amount of installation space.

In order to remedy this, a technical solution for a temperature-controlled SCR line section has been described in DE10,2014/112,731 A1, which provides that the respective same-side ends of the first line, i.e., of the line for guiding the reductant, preferably of a hose line, and of the casing, preferably of a tube, such as in particular a corrugated tube, are connected to a reductant-coupling housing, and the ends of the second line, i.e., of the line for guiding a temperature-control agent, also a hose line, are each connected to a temperature-control agent line coupling part separate from this coupling housing, wherein the reductant-coupling housing includes a through-opening on its outer circumference, through which the temperature-control agent is guided outward from the interior of the casing tube. This known technical solution is a line section of the above-mentioned type, that first allows the—temperature control agent line to also be guided in the housing sectionally parallel to the reductant line, but then to branch off and guide back for a terminal of the temperature-control agent line coupling part that is greatly displaced with respect to the reductant terminal via one or more shape bends. Here the reductant coupling housing is preferably formed from two—assemblable housing shells, wherein the through-opening for the temperature control agent line is preferably located completely inside one of the two shells. This known technical solution ensures a sufficient temperature control of the SCR system, wherein the line section or also the also-described line bundle with SCR vacuum line, SCR return line section, and SCR pressure line section can be flexibly and simply installed in various installation situations and application cases and are also cost-effective to manufacture. However, the section of the reductant line located in the housing disadvantageously remains unheated or must additionally be electrically heated.

SUMMARY

The object of the invention is to provide a line section of the above-mentioned type for the temperature-controlled guiding of a reductant, which line section can be flexibly and simply installed in various installation situations and application cases, in addition is cost-effectively manufacturable and ensures an improved temperature control of the SCR system in comparison to the prior art. An additional electrical heating shall be able to be omitted here.

The object is inventively achieved by both lines extending adjacent to each other, in particular guided in parallel through the entire coupling housing.

The first line for guiding the reductant, on which a line connector can optionally be located, can thus advantageously be heated by the second line for guiding the temperature control agent, not only—as according to the prior art—partially, but rather over its entire length lying in the housing. The necessity of additional electrical heating is thereby eliminated. Here the respective length of the lines, including optionally present connectors, can be considered as a line-guide total length of the coupling housing, provided these are located in the housing.

The simple structure with the two lines guided in parallel in the casing and then in the housing makes possible a simple manufacturing of the inventive section and a sufficient protection of the lines as well as an effective transfer from the second line to the first line.

With respect to the specific design of the lines, the following terminology is established according to the application. "Tube" means a dimensionally stable line having a closed cross-section, which is particularly suitable for the pumping of the relevant fluids "reductant" and "temperature-control agent." "Hose" means a flexible line having a closed cross-section having particular suitability for pumping these fluids. For the two lines here all combinations—i.e., hose/hose, hose/tube, and tube/tube—are possible, wherein the first-mentioned hose-hose combination is preferred. Dimensionally stable lines, i.e. tubes, can be manufactured from a thermoplastic material such as polyamide, in particular from the material PA 12. Flexible lines, i.e., hoses, can be manufactured from an elastomeric material, such as from a thermoplastic elastomer, optionally including a reinforcing insert.

The casing can also be formed flexibly or dimensionally stable, wherein in a preferred design as corrugated tube in contrast to the above definition, depending on the material used and the wall thickness, a lesser or preferably more pronounced flexibility can also be present, so that hose lines surrounded by a corrugated tube can be bent and placed in particular without the need of a thermoplastic softening of the corrugated tube.

After an entry on an entry side of the housing through a common entry opening of the coupling housing for the two lines guided in parallel and in particular completely surrounded by the casing, the casing can then end in an entry-end region of the coupling housing, which entry-end region connects to the entry opening and forms a casing receptacle, so that the two lines each extend separately from each other through the rest of the housing.

In the interior of the coupling housing, with substantial omission of disruptive separating walls between the two lines, which separating walls hinder heat transfer, the heat transfer can be carried out in a common receiving space for the two lines, which could also be referred to as an air chamber. In order to minimize the convective proportion of heat transfer here in favor of the thermally conductive proportion, it is advantageous here if the two lines furthermore directly abut against each other at least sectionally—as with the surrounding with the casing prior to the insertion into the housing.

The coupling housing can be formed in particular from two, or also from more, assemblable or assembled housing shells, wherein these housing shells can be formed in an advantageous manner in terms of manufacturing technology—from the standpoint that, unlike according to DE10,2014/112,731 A1 a through-opening is provided on the outer circumference in only one shell—symmetrical with respect to a central plane extending through the longitudinal axis of the housing. With respect to high ease of assembly and with respect to the possibility of a simple separation from each other, as needed, for removal, the housing shells can be designed to be lockable to each other by means of locking elements formed on them and correspondingly configured in a complementary manner to each other. The coupling housing can be manufactured from a thermoplastic material, such as from polyamide, in particular from the material PA 6 or PA 66. It can be manufactured in a technologically advantageous manner using an injection molding process.

On the outlet side of the coupling housing, which is axially opposite the entry side, there can be separate outlet openings for the two lines guided parallel to this outlet side. Here in particular in an embodiment further developing the invention the temperature-control agent line can be simply guided out of the housing, or—preferably as with the reductant line—end inside the housing in a plug terminal. The enclosure of the two outlet openings by the common housing here causes the inventive line section to be able to be easily installed even with particularly small assembly installation space requirements while avoiding lateral line branches.

Here the outlet openings can lie on the outlet side in a housing plane or in two housing planes offset parallel to each other, so that a plug connector located respectively at the end of the first line for guiding the reductant and at the end of the second line for guiding a temperature control agent can advantageously be inserted parallel or simultaneously into both corresponding coupling parts. This possibility of common pluggability represents a further advantage of the invention. The free end of the inventive line section is thus then configured as a reductant-temperature-control-agent-line double plug.

The free end of the inventive line section, which end is intended for the terminal, and here in particular of its housing, can be formed straight, or—as shown in the following exemplary embodiment—in a preferred design as an angle piece, i.e., with a bend or arch in the course along the lines, in particular with a—seen integrally—longitudinal axis angled by 90°.

In the context of the application the expression "connector" is understood to be a superordinate term for the terms "plug"/"plug connector"/"plug connector part" (English: "male part")—where these terms are used—and for the terms "plug coupling"/"plug sleeve"/"sleeve part" (English: "female part")—where these terms are used—wherein at the respective free end both of the temperature-control agent line and the reduction agent line either a plug part or sleeve part can be located.

Advantageously—if present—connectors respectively located end-side on both lines can also be disposed such that a reversed terminal is not possible by, for example, a plug coupling or plug sleeve being used for the temperature-control agent line, and a plug being used for the temperature-control agent line, or vice versa. In such a case identical nominal sizes for sleeve part and plug are also possible without thereby having the risk of misassembly. Different nominal values also prevent a misassembly per se. In specific application this corresponds to the general principle of "Poka Yoke" developed by the Japanese Shigeo Shingō, which translates roughly from the Japanese as "to avoid unfortunate errors," in this case assembly errors. A corresponding embodiment of the output side of the inventive line section thus contains a technical provision for error prevention when the inventive line section is incorporated into an SCR system during assembly.

A connector receptacle for the temperature-control agent terminal, which receptacle is formed in the housing, can be embodied by a slight over-dimensioning of the receiving space for the connector, which receiving space is located in an outlet end region of the coupling housing, such that a radial and axial tolerance compensation exists during plugging-in. A "clearance of the receptacle" thus exists, which in particular advantageously improves the pluggability if two connectors are plugged in parallel.

However, inside the coupling housing the lines, or at least one line, such as preferably the second line for guiding the temperature-control agent, can have bends. These bends make possible an optimized path of the lines against each other or along connectors located on the lines, whereby the installation space in the housing can be optimally utilized and the heat exchange can be intensified. The shape of the path of the lines is determined here by the internal formation of the housing, wherein for this purpose circumferential bridges and/or forming or form-guiding, in particular point-type, support elements can be disposed, in particular formed. In the sense of preventing an influence impeding the heat transfer, the number of such bridges or support elements can be reduced to a necessary minimum and they can also be disposed only one-side in a housing half. The first line and/or the second line can thereby each be guided through the coupling housing at least sectionally straight and/or arched.

BRIEF DESCRIPTION OF THE DRAWINGS

Further advantageous designs of the invention arise from the following Figure description and the dependent subclaims.

Shown here.

DETAILED DESCRIPTION

In the various Figures of the drawings identical parts are always provided with the same reference numbers and are therefore generally only described once.

With respect to the following description it is claimed here that the invention is not limited to the exemplary embodiment and here not to all or a plurality of features of described feature combinations, but rather each individual partial feature of the exemplary embodiment is also of significance to the subject matter of the invention separately from all others in the context of partial features thus described and also in combination with other features.

Figure 1:
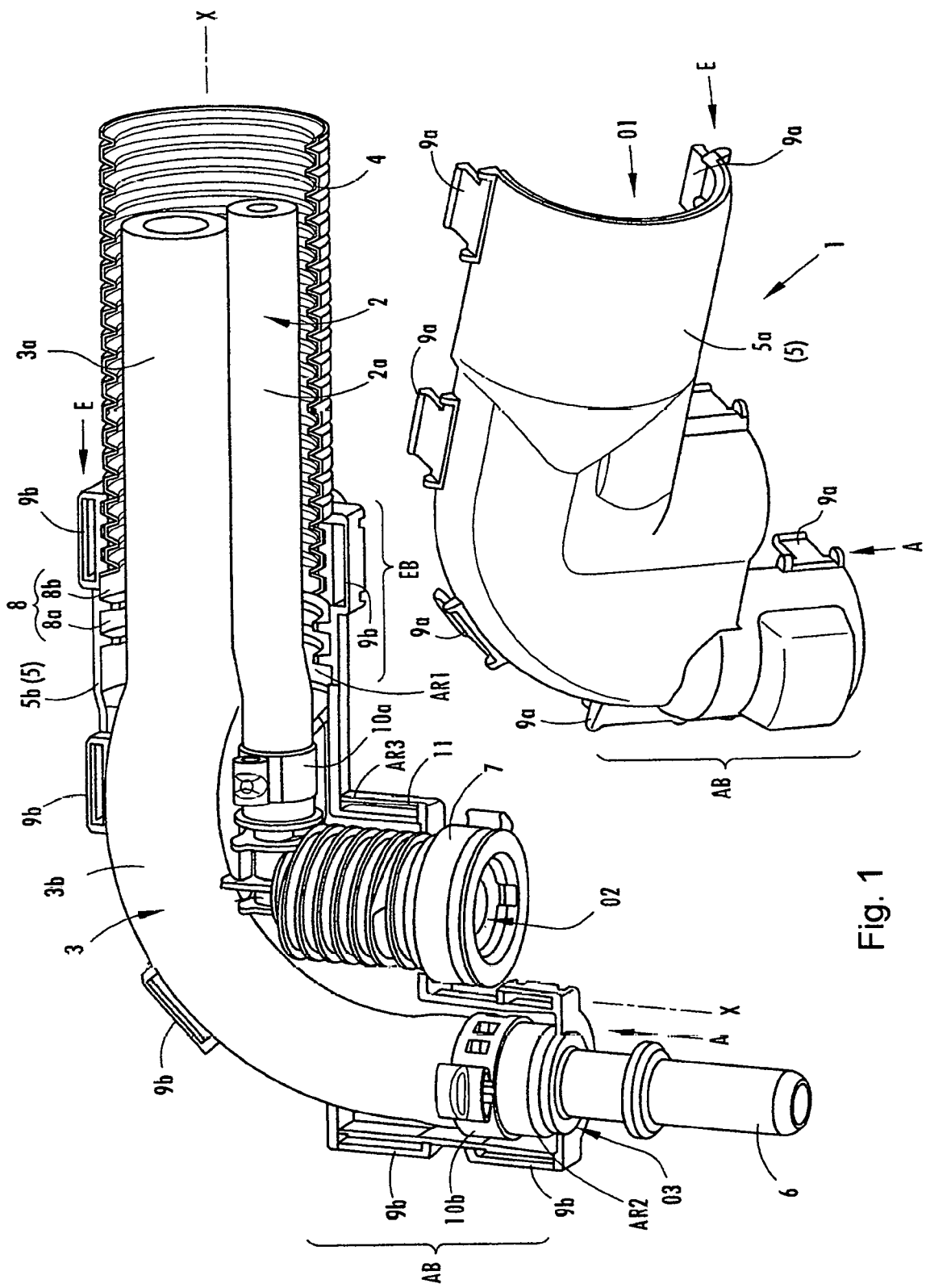
FIG. 1 shows a perspective exploded view of an end of a preferred embodiment of an inventive line strand with half-open coupling housing.
Figure 2:
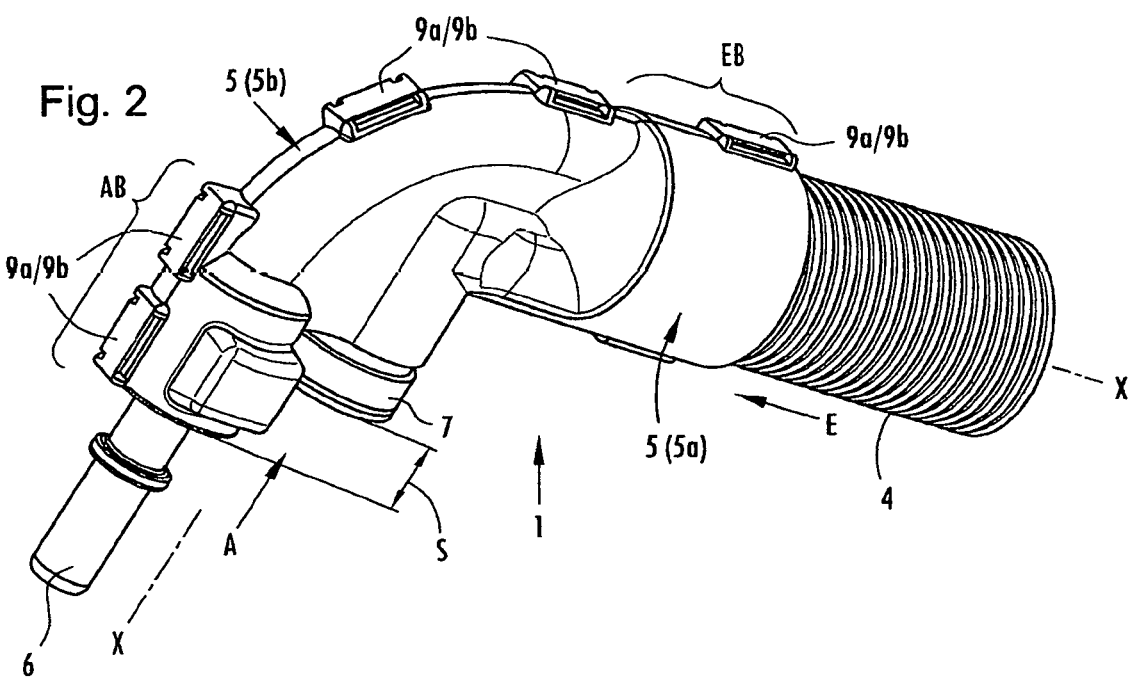
FIG. 2 shows a three-dimensional view of the end depicted in FIG. 1 of the inventive line strand, but with closed coupling housing.

As shown in FIG. 1 and FIG. 2, the invention relates to a line section 1 for temperature-controlled guiding of a reductant for the exhaust gas post-treatment of an internal combustion engine. The line section comprises a first line 2 for guiding the reductant and a second line 3 for guiding a temperature control agent as well as a casing 4 surrounding the two lines 2, 3, wherein the two lines 2, 3 are disposed extending adjacent to each other in the casing 4 and guided in a coupling housing 5. The casing 4 is connected to the coupling housing 5. In particular, the two lines 2, 3 are fixed one-side in the coupling housing 5 together with the casing 4.

In a preferred design both lines 2, 3 are each formed as a hose and manufactured from an elastomeric material, such as from a thermoplastic elastomer, optionally with a reinforcing insert.

According to the invention both lines 2, 3 are guided adjacent to each other, in particular directly adjacent, preferably in parallel, through the entire coupling housing 5, wherein they extend from an entry side E to an axially opposing outlet side A. The second line 3 for guiding a temperature control agent could also be wound helically around the first line 2 for guiding the reductant. Here the respective length of the lines 2, 3, i.e., the hoses, including the optionally present connectors 6, 7 depicted in FIGS. 1 and 2, is considered as a line guide total length of the coupling housing 5 provided the lines 2, 3 and the connectors 6, 7 extend into the housing 5.

The casing 4 is preferably configured flexible and in particular as a tube, preferably—as depicted—as a corrugated tube. The casing 4 ends in an entry end region EB of the coupling housing 5, which entry end region EB is connected to the entry opening O1 and forms a sleeve receptacle 8 by means of two bridges 8a, 8b. The corrugated tube is fixed in the casing receptacle 8 at least in a form-fit manner, optionally also in a friction-fit and/or materially-bonded manner.

The two lines 2, 3 then each extend separately through the rest of the housing 5, in particular at least partially through a common receiving space AR1 for the two lines 2, 3, wherein the two lines 2, 3, preferably at least regionally, abut directly against each other.

Figure 3:
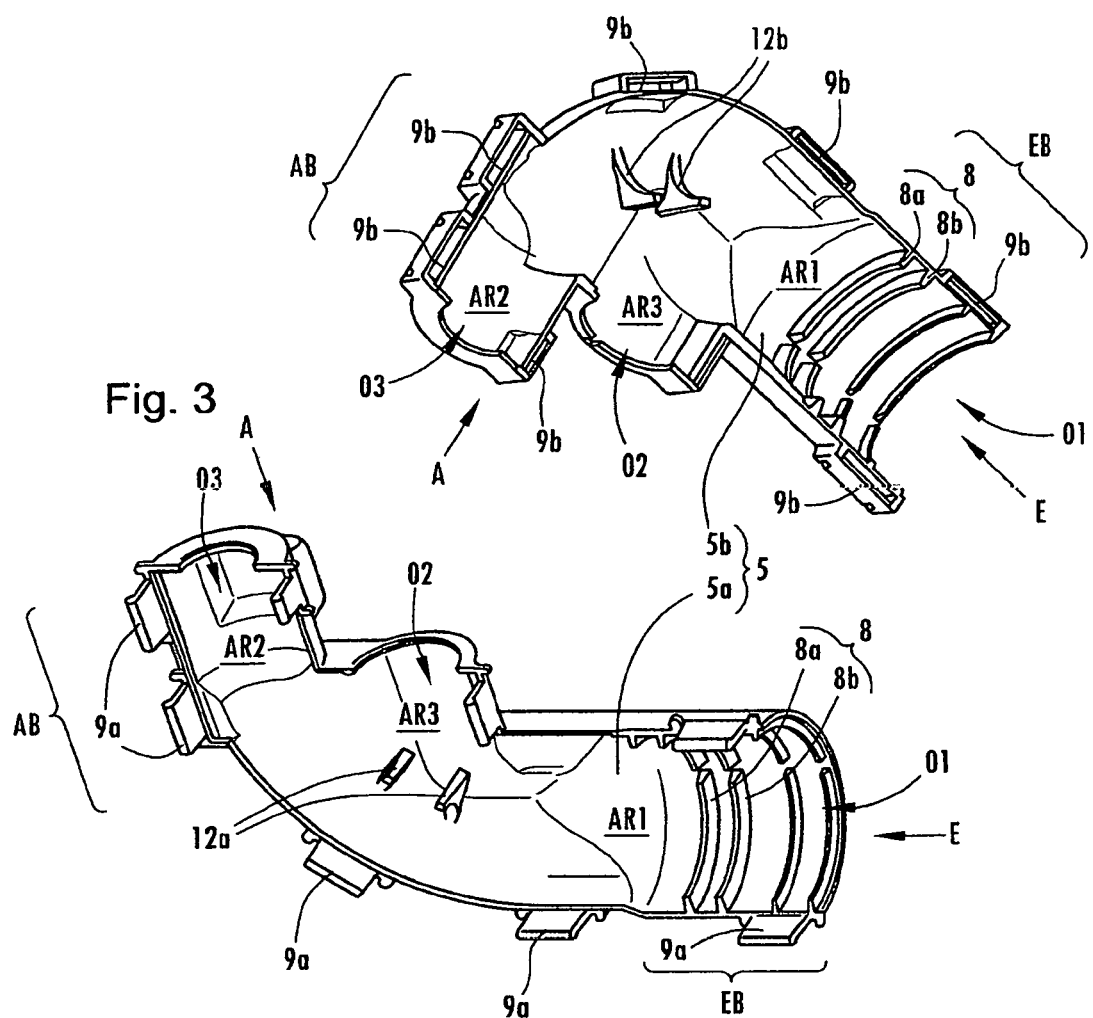
FIG. 3 shows a perspective exploded view of an open coupling housing of the preferred embodiment of the inventive line strand seen in FIGS. 1 and 2.
Figure 4:
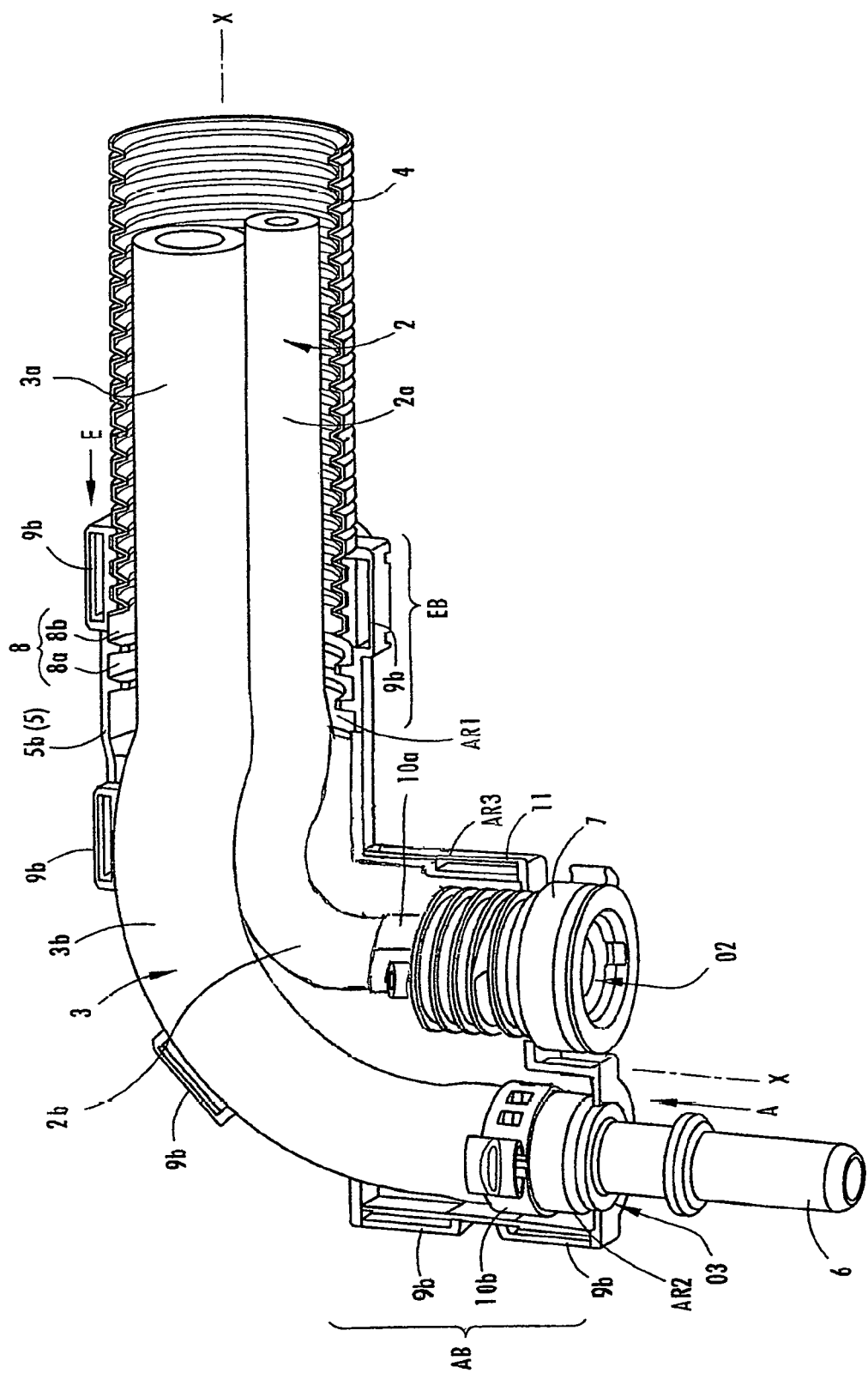
FIG. 4 shows a perspective exploded view of an end of another preferred embodiment of an inventive line strand with half-open coupling housing and showing outlet openings in a single housing plane.

The coupling housing 5, which is depicted separately in FIG. 3, can be manufactured from a thermoplastic material, such as from polyamide, in particular from the material PA 6 or PA 66. In the depicted illustration it is formed from two assemblable, or in FIG. 2 assembled, housing shells 5a, 5b, wherein the housing shells 5a, 5b are preferably formed as half shells symmetrically formed with respect to a central plane extending through the longitudinal axis X-X of the housing 5. The central plane not indicated in more detail is the dividing plane in FIG. 1. The housing shells 5a, 5b include locking elements 9a, 9b configured complementary to each other, using which the housing shells 5a, 5b are lockable to each other. The locking elements 9a, 9b are located both in the entry end region EB on the entry side E, and in an outlet end region AB on the axially (housing axis X-X) opposite outlet side A of the housing 5 for the lines 2, 3.

On its entry side E the coupling housing 5 includes a single common entry opening O1 for the two lines 2, 3 surrounded by the casing 4, and on its outlet side A two separate outlet openings O2, O3, exactly one first outlet opening O2 for the first line 2 for guiding the reductant, and exactly one second outlet opening O3 for the second line 3 for guiding the temperature control agent. The outlet openings O2, O3 lie on the outlet side A in two housing planes offset with respect to each other, whose surface normals each extend in particular parallel to the housing longitudinal axis X-X. These planes are thus preferably disposed parallel to each other with axial distance (reference number S in FIG. 2), wherein the housing axis X-X stands perpendicular thereto.

The already mentioned connectors 6, 7 are respectively located at the end of the first line 2 and at the end of the second line 3, wherein these are fixed in the outlet end region AB in the coupling housing 5 and protrude from the coupling housing 5. The connectors 6, 7 are each inserted into the lines 2, 3 and each attached to a hose clamp 10a, 10b, as FIG. 1 shows.

The connector 7 on the first line 2 that serves to guide the reductant is a sleeve part, in particular an angle connector, that redirects the flow of the fluid in its interior by 90°. The (single) hose section 2a of the first line 2, which hose section 2a lies in the housing 5, can thereby be guided exclusively straight—i.e., without bends and curves—through the coupling housing 5.

The connector 6 on the second line 3 that serves to guide the temperature control agent is a—preferably configured straight—plug part.

The connectors 6, 7 are thus disposed such that a reversing is not possible, which corresponds to the already mentioned "Poka Yoke" principle. Thus, both different and identical nominal sizes for coupling and plug are possible for the connectors 7, 6 of the lines 2, 3 without there being risk of assembly errors. Both connectors 6, 7 can be simultaneously coupled to each of the not-depicted complementary connector parts.

A hose section 3b of the second line 3 that connects to a straight hose section 3a directed away from the entry side E, is guided here arcuately through the coupling housing 5. In terms of its scope an arcuate hose section 2b adjacent the hose section 2a of the first line 2, which hose section 2a lies in the housing 5, as well as the connector 7, may have located on its outer side hose section 3b so that for the temperature control of the first line 2 a maximum-sized surface for the heat transfer is available by the second line 3 having the larger radius of curvature lying on the outer side and the first line 2 having a smaller radius of curvature lying on the inner side. An electrical heating unit can be omitted here.

Nevertheless, it can be seen from FIG. 1 that the sleeve part, i.e., the connector 7 of the first line 2, carries heater coil guide elements 11 on its outer circumference. This conventional function of the sleeve part as support for electrical heating wires is common for conventional connector parts. However, these conventional parts can advantageously be used in the context of the invention in the sense of a high flexibility. However, the carrier function for the heat conductor is not used here according to the invention. Rather, however, the heating coil guide elements 11 advantageously enlarge the heat exchange surface on the connector 7. Of course there is also the possibility to leave out the heating coil guide elements 11 and guide the temperature control agent line 3 directly along the connector 7.

As can be further seen from FIG. 1, a receiving space AR2, AR3 for a connector 6, 7, in particular the receiving space AR2 for the connector 6 located on the second line 3 for guiding the temperature control agent, which receiving space AR2, AR3 is formed in the coupling housing 5 and located in the outlet end region AB of the coupling housing 5, can have a smaller over-dimensioning with respect to the external size of the connector 6 so that the connector 6 lies in the respective receiving space AR2, AR3 with clearance. This improves the ease of assembly, in particular if both connectors 6, 7 are plugged in parallel, since a radial and axial tolerance compensation is thereby affected during the plugging.

In the coupling housing 5 shape-guiding and/or shaping support elements 12 can be disposed, in particular formed, such as circumferential bridges, intermediate walls, and/or in particular point-type support nubs. For this purpose, by way of example mutually complementary hook-shaped retaining elements 12a, 12b, 12b, which hook-shaped retaining elements 12a, 12b at least partially surround the respective circumference of the lines 2, 3 are depicted in the housing parts 5a, 5b of the coupling housing 5. Large intermediate walls that could hinder heat exchange can be advantageously omitted.

In contrast to the embodiment depicted, the coupling housing 5 could also be injected completely as a molded part around the parts lying therein.

Furthermore, the material of the coupling housing 5 could have an increased specific thermal conductivity (for example, 5 W/(m K), preferably ≥10 W/(m K), particularly preferably ≥30 W/(m K), measured according to DIN EN ISO 8302:1991, at 0° C., in comparison to plastics in order to achieve a better heat distribution in the housing interior. Thus with plastics a specific thermal conductivity in the range of 0.15 W/(m K) to 0.6 W/m K, for polyamide in particular in the range of 0.25 W/(m K) to 0.35 W/(m K). Copper alloys, such as brass, instead have a specific thermal conductivity in the range of 30 W/(m K) to 110 W/(m K). Metal particles or reinforcements embedded in plastic raise—seen integrally—the specific thermal conductivity of the coupling housing 5. However, in order to prevent the heat from being dissipated outward from the coupling housing 5, the coupling housing 5 can be embodied double-walled, wherein it includes a highly thermally conductive inner wall and a less thermally conductive outer wall.

The invention is not limited to the exemplary embodiment shown and described, but rather also comprises all embodiments which work the same way in the sense of the invention. It is emphasized that the exemplary embodiment is not limited to all features in combination, rather each individual partial feature can also have inventive significance in isolation from all other partial features. Thus, the two housing shells 5a, 5b can also be formed asymmetrically. The connectors 6, 7 can lie outside the housing 5 and/or be embodied other than depicted. For example, it can also be two plug parts combined with each other or two sleeve parts. The casing 4 could also end on the entry side E of the coupling housing before the entry opening O1, wherein then only the two lines 2, 3 are guided through the entry opening O1. It can also be provided to arrange heat transfer elements between cooling water hose and connector, wherein for this purpose the most diverse possibilities are available such as metallic insert parts, a casting having a particularly thermally conductive mass, the application of gel cushions, etc.

Furthermore, the invention is so far not yet limited to the combinations of features defined in the claims, but rather can also be defined by any other combination of specific features of all of the individual features disclosed.

The invention claimed is:

1. A line section for temperature-controlled guiding of a reductant for the exhaust gas post-treatment of an internal combustion engine, the line section comprising:
   a first line for guiding the reductant,
   a second line for guiding a temperature control agent, and
   a casing surrounding the first and second lines, wherein the first and second lines are disposed adjacent to each other in the casing and guided in a coupling housing, and the casing being connected to the coupling housing, wherein the first and second lines each having a line-guided total length that is guided through the entire coupling housing extending adjacent to each other.

2. The line section according to claim 1, wherein the first and second lines extending parallel to each other and abutting against each other.

3. The line section according to claim 1, wherein the first line and the second line are fixed together with the casing in the coupling housing, wherein the casing is held with a positive engagement.

4. The line section according to claim 1, wherein at least one of the first line and the second line is formed as a tube and manufactured from a thermoplastic material.

5. The line section according to claim 1, wherein at least one of the first line and the second line is formed as a hose and is manufactured from an elastomeric material.

6. The line section according to claim 1, wherein the casing is formed one of flexible or dimensionally stable and one of a tube or a corrugated tube.

7. The line section according to claim 1, wherein the coupling housing includes an entry side and an outlet side opposite the entry side and including separate outlet openings for the first and second lines.

8. The line section according to claim 7, wherein the coupling housing includes a common entry opening on the entry side for the first and second lines surrounded in by the casing.

9. The line section according to claim 7, wherein the outlet openings lie on the outlet side in a single housing plane.

10. The line section according to claim 8, wherein the casing ends in an entry end region of the coupling housing, the entry end region connecting to the entry opening and forming a casing receptacle, so that the first and second lines each extend separately through the housing through a common receiving space for the first and second lines, wherein the two lines abut directly against each other at least in regions.

11. The line section according to claim 1, wherein the coupling housing is manufactured from a thermoplastic material.

12. The line section according to claim 1, wherein the coupling housing is formed from two assembled housing shells, wherein the housing shells are formed as half shells symmetrically with respect to a central plane extending through a longitudinal axis of the housing.

13. The line section according to claim 12, wherein the housing shells have locking elements formed complementary to each other and by which the housing shells are latchable to each other.

14. The line section according to claim 1, wherein the first line and the second line are each guided sectionally straight through the coupling housing.

15. The line section according to claim 1, wherein shape-guiding and/or shaping support elements are disposed in the coupling housing and formed as one of circumferential bridges, point-type support nubs and mutually complementary hook-shaped retaining elements at least partially engaging the respective circumference of the first and second lines.

16. The line section according to claim 4, wherein the thermoplastic material is PA 12.

17. The line section according to claim 1, wherein the coupling housing is manufactured from a thermoplastic material, and wherein the thermoplastic material is one of PA 6 and PA 66.

18. The line section according to claim 7, wherein the outlet openings lie on the outlet side in two housing planes offset with respect to each other.

19. The line section according to claim 1, wherein the first line and the second line are each guided sectionally arcuately through the coupling housing.

20. A line section for temperature-controlled guiding of a reductant for the exhaust gas post-treatment of an internal combustion engine, the line section comprising:
a first line for guiding the reductant,
a second line for guiding a temperature control agent,
a casing surrounding the first and second lines, wherein the first and second lines are disposed adjacent to each other in the casing and guided in a coupling housing, and the casing being connected to the coupling housing, wherein both the first and second lines are guided through the entire coupling housing extending adjacent to each other, and
a first connector attached to an end of the first line and a second connector attached to an end of the second line, the first and second connectors being respectively attached to the first and second lines inside of the coupling housing in an outlet end region.

21. The line section according to claim 20, wherein a plug part is located on the end of the first line and a sleeve part on the end of the second line or a sleeve part on the end of the first line and a plug part as connector is located on the end of the second line.

22. A line section for temperature-controlled guiding of a reductant for the exhaust gas post-treatment of an internal combustion engine, the line section comprising:
a first line for guiding the reductant,
a second line for guiding a temperature control agent,
a casing surrounding the first and second lines, wherein the first and second lines are disposed adjacent to each other in the casing and guided in a coupling housing, and the casing being connected to the coupling housing, wherein both the first and second lines are guided through the entire coupling housing extending adjacent to each other, and
a receiving space being formed in the coupling housing and located in an outlet end region of the coupling housing, the receiving space being for a connector located on the second line and being over-dimensioning with respect to the connector so that the connector lies in the receiving space with clearance.

* * * * *